United States Patent Office 2,971,318
Patented Feb. 14, 1961

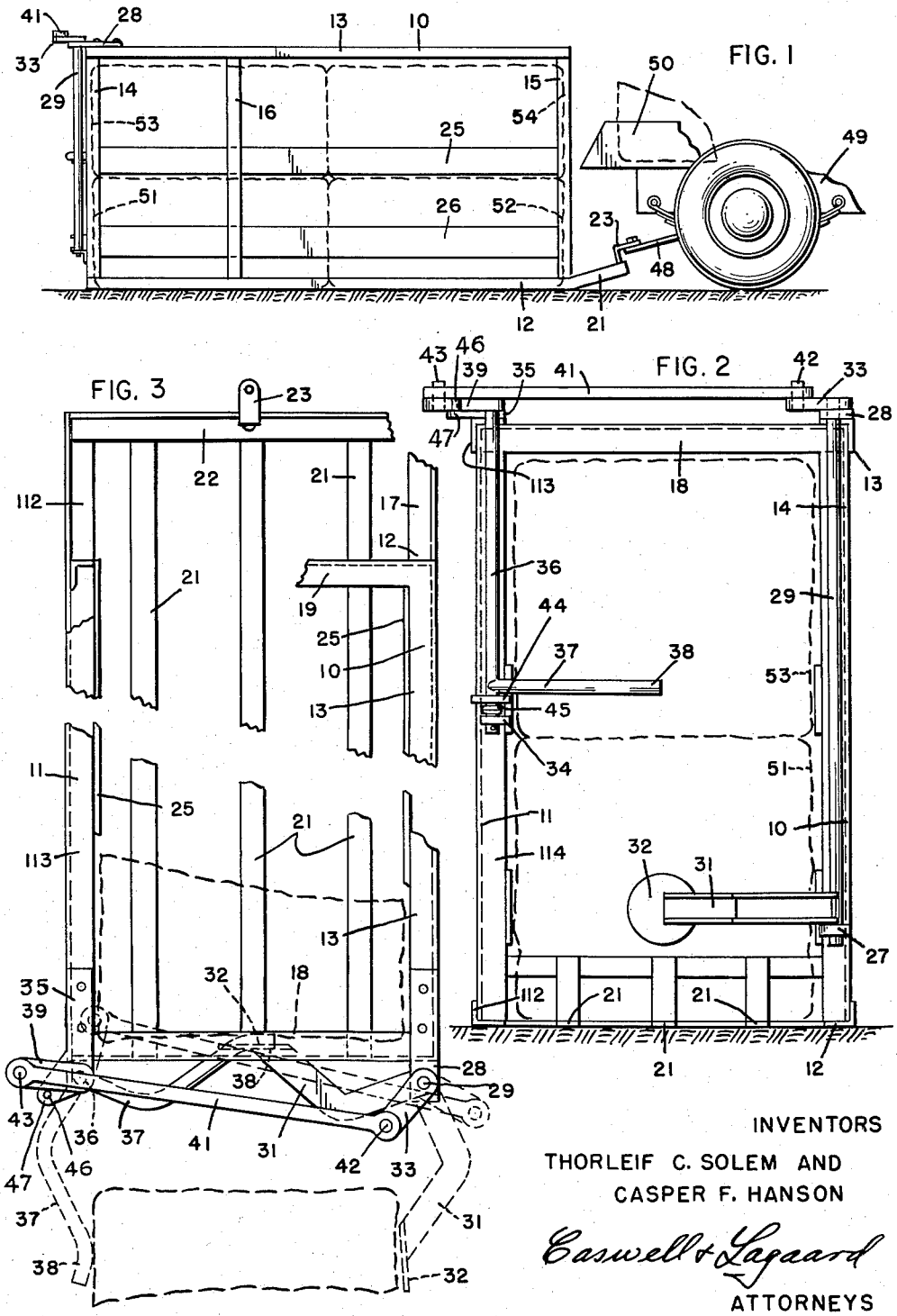

2,971,318

BALE STACKER

Thor Leif C. Solem and Casper F. Hanson, Minneapolis, Minn., assignors to Johnson Hydraulic Equipment Company, Minneapolis, Minn., a corporation of Minnesota Filed Feb. 26, 1959, Ser. No. 795,822

11 Claims. (Cl. 56—473.5)

The herein disclosed invention relates to bale stackers and has for an object to provide a bale stacker which, when drawn by a baler, will receive the bales delivered by the baler and automatically deposit them upon the ground in groups without the assistance of the operator.

Another object of the invention resides in providing a construction particularly applicable to a stacker having draft means drawn by a baler and having a bale engaging member pivoted to a part fixed relative to the draft means for movement from a position of engagement with a bale to a position clear of the bale.

An object of the invention resides in providing a bale stacker which will pile the bales in two tiers with one or more bales to the tier.

A still further object of the invention resides in providing a swinging bale engaging member for engagement with the rearmost bale of the lower tier.

An object of the invention resides in providing latching means for restraining movement of the bale engaging member and trip means operated by the motion of a bale to release the latching means and free and bales.

Another object of the invention resides in mounting said bale engaging member for swinging movement about a substantially vertical axis.

A still further object of the invention resides in mounting said trip for swinging movement about a substantially vertical axis.

An object of the invention resides in constructing the draft means with spaced runners and in providing uprights secured to the runners at their rearward ends and to which the bale engaging member and the trip are pivoted.

Other objects of the invention reside in the novel combination and arrangement of parts and in the details of construction hereinafter illustrated and/or described.

In the drawings:

Fig. 1 is a side elevational view of a bale stacker illustrating an embodiment of the invention applied thereto.

Fig. 2 is a rear end elevational view of the structure shown in Fig. 1 and drawn to a greater scale.

Fig. 3 is a plan view with parts broken away of the structure shown in Figs. 1 and 2 and drawn to the same scale as Fig. 2.

The form of the invention illustrated comprises two fences 10 and 11 which are spaced from one another a distance greater than the width of a bale and are open at their ends to allow the bales to pass completely through the stacker. These fences are of the same construction and only the fence 10 will be described in detail. The same reference numerals preceded by the numeral 1 will, however, be applied to the corresponding parts of the fence 11.

The fence 10 comprises a longitudinal runner or draft member 12 constructed of angle iron and resting on the ground. Superimposing this runner and spaced therefrom is a longitudinal frame member 13 also constructed of angle iron. Two angle iron uprights 14 and 15 are disposed between the runner 12 and the frame member 13. It will be noted that the runner 12 has an extension 17 which is turned up in the manner of the runner of a sled to permit of travel of the stacker more readily over the ground. Also, an intermediate upright 16 is employed which is disposed between said runner and frame member. Slats 25 and 26 are secured to the uprights 14, 15 and 16 and are disposed on the interior thereof. These slats prevent the bales from catching on said uprights. To tie the parts together, lateral crossbars 18 and 19 are employed, which extend across the longitudinal frame members 13 and 113. A horizontal crossbar 22 constructed of angle iron extends between the runners 12 and 112 and has attached to it a coupling 23 by means of which the stacker may be coupled to the drawbar of a baler and drawn thereby. All of these parts are securely welded together.

In addition to the runners 12 and 112, a number of runners 21 are employed, which are disposed therebetween and which are constructed of flat stock and which underlie and are bolted or welded to the crossbar 22. The rear ends of runners 21 are free and float on the ground. The fences 10 and 11 including runners 12 and 112 and runners 21 constitute draft means for drawing the stacker over the ground.

The bales are held in position within the fences 10 and 11 by means of the following construction:

Attached to the upright 14 is a bearing 27 and attached to the longitudinal frame member 13 is another bearing 28. The bores of these bearings align and receive a substantially vertically extending shaft 29. This shaft has welded to it a first arm 31 which is adapted to extend transversely across the space between the fences 10 and 11. This arm has attached to the outer end of it a bale engaging member 32 which is situated at a height less than the height of a bale to engage the end of a bale along which the stacker passes and to drag the bale along with the stacker. The bearings 27 and 28 constitute bearing means for supporting the bale engaging member 32 for swinging movement in a horizontal plane. The shaft 29 has attached to the upper end of it a second arm 33 which extends substantially in a front to back direction during movement of the arm 31 and the bale engaging member.

On the upright 114 is attached a bearing 34 and on the longitudinal frame member 113 is attached a bearing 35, similar to the bearings 27 and 28. These bearings rotatably support a substantially vertically disposed shaft 36. Somewhat above the bearing 35 is welded to it a third arm 37 which is formed at the end thereof with a trip 38, best shown in Fig. 3. This arm normally extends transversely of the stacker, as shown in full lines in said figure, and may swing to a position outside of the space between the fences 10 and 11 as shown in dotted lines in said figure. The bearings 34 and 35 form bearing means for supporting the trip 38 for swinging movement in a horizontal plane. A fourth arm 39 is attached to the upper end of shaft 36 and extends transversely when trip 38 is in bale engaging position and longitudinally when said trip is in its clear position. A link 41 is pivoted by means of pins 42 and 43 to the arms 33 and 39 and causes bale engaging member 32 to swing from its full line position to its dotted line position as trip 38 swings from its full line position to its dotted line position. When the parts are disposed as shown in full lines in Fig. 3, link 41 lies in alignment with arm 39 or a little over dead center to form together with said arm and the arm 33 a latching means restraining movement of bale engaging member 32 when pressure is applied to the same.

Immediately below the arm 37 is mounted on shaft 36 a collar 44 and between this collar and bearing 31 is a torsion spring 45 which encircles shaft 36 and is anchored at one end to collar 44 and at its other end to upright 114. This spring is tensioned to urge shaft 36 to rotate in a direction tending to move bale engaging member 32 and trip 38 into bale engaging movement. To limit such movement, a stop 46 mounted on a bracket 47 on the side of the bearing 35 engages arm 39 and terminates the movement thereof.

To more clearly illustrate the operation of the invention the same has been shown as coupled to the drawbar 48 of a baler 49 whose bale delivery chute is designated by the reference numeral 50. This chute is positioned to deliver at a height above the height of a bale.

The method of operation is as follows: As the baler is propelled over the ground the hay in the windrows is picked up and baled and the bales delivered to the stacker from the chute 50. As the bales leave this chute they are directed in between the fences 10 and 11 and drop on the runners 21. Stubble projecting upwardly between the runners engage the bales and arrest movement thereof while the stacker slides over the ground in a forward direction. Assume that the stacker is empty. The first bale 51 when delivered stays on the ground until bale engaging member 32 engages the end thereof and drags it forwardly while at the rear end of the stacker. When the second bale 52 is delivered, it in a similar manner is discharged in between the fences 10 and 11 and in back of the bale 51. It, too, by engagement with the ground is brought up against bale 51 and both bales dragged with the stacker. The third bale 53 is then deposited on top of bale 52 and pushed along said bale by the conveying means in the baler until it is free from the baler. It then remains on bale 52 and rides along with bales 51 and 52. When the fourth bale 54 is delivered, it engages bale 53 and pushes bale 53 rearwardly until it rides upon bale 51. During its final movement, bale 53 engages trip 38 and throws arm 39 and link 41 out of alignment. Arm 31 is now free to move rearwardly and laterally. Both bales 51 and 52 being in engagement with the ground cease being dragged and the runners 21 are pulled from in under the bales and the stack of bales, two tiers high and two in a tier is left standing on the ground. During release of the stack, bale engaging member 32 and trip 28 are forced outwardly by the bales 51 and 52 and when the stacker leaves the bale 52 spring 45 returns the parts to normal position.

The advantages of the invention are manifest. The stacker is completely automatic in operation and is automatically tripped when fully loaded. The device does not need an extra hand at the stacker and is hence economical to operate. The stacker is exceedingly simple in construction and can be built at a nominal expense. The mechanism is foolproof and needs no special care.

Changes in the specific form of the invention, as herein described, may be made within the scope of what is claimed without departing from the spirit of the invention.

Having described the invention, what is claimed as new and desired to be protected by Letters Patent is:

1. In a bale stacker drawn by a traveling rear delivery hay baler delivering at an elevation above the height of a bale, said stacker having longitudinally extending draft means connected to the baler and extending in a rearward direction, said draft means including spaced longitudinally extending runners engaging the ground and on which bales are deposited, the combination of a bale engaging member carried by said draft means and pivoted for swinging movement about a vertical axis, said bale engaging member being movable from a position engageable with a bale discharged from the baler and deposited on said runner to cause the bale to travel with the stacker and to a position to one side of the bale and free therefrom, the bale upon engaging the runners also engaging the ground and the bale engaging member being brought into engagement therewith upon travel of the stacker, said baler depositing a second bale upon said runners in front of said first bale, a third bale directly upon said second bale and a fourth bale in front of said third bale and progressing said fourth bale to cause said third bale to move to the end of said first bale, latch means acting between said bale engaging means and said draft means and holding said bale engaging means in bale engaging position, and trip means acting between said latch means and said draft means and engageable with the third bale subsequently discharged upon the first named bale to trip the latch means and release the bales from the stacker said first and second bales engaging the ground between runners and upon release coming to rest on the ground, propulsion of the baler causing the runners to be withdrawn from beneath the deposited bales.

2. In a bale stacker drawn by a traveling rear delivery hay baler delivering at an elevation above the height of a bale, said stacker having longitudinally extending draft means connected to the baler and extending in a rearward direction, the combination of a bale engaging member carried by said draft means and pivoted for swinging movement about a vertical axis, said bale engaging member being movable from a position engageable with a bale discharged from the baler to cause the bale to travel with the stacker and to a position to one side of the bale and free therefrom, latch means acting between said bale engaging means and said draft means and holding said bale engaging means in bale engaging position, trip means acting between said latch means and said draft means and engageable with a bale subsequently discharged upon the first named bale to trip the latch means and release the bales from the stacker, and resilient means acting between a part movable with said bale engaging member and said draft means and returning said bale engaging member to bale engaging position upon discharge of the bale from the stacker.

3. In a bale stacker drawn by a traveling rear delivery hay baler having longitudinally extending draft means connected to the baler and extending in a rearward direction, the combination of a bale engaging member disposed at the rearward ends of said draft means and engageable with the rear end of a bale delivered by the baler, pivot means between said draft means and bale engaging member and having a substantially vertical axis and supporting said member for swinging movement in a substantially horizontal plane from a bale engaging position to a lateral position clear of the bale, latching means acting between said draft means and bale engaging member for holding said bale engaging member in bale engaging position and a trip engageable with the rear end of a following bale, pivot means between said draft means and said trip and having a substantially vertical axis, said trip upon engagement with the following bale being moved a lateral direction in a substantially horizontal plane from a bale engaging position to a position clear of the second named bale and in a direction to move the latching means into unlatching position to unlatch said bale engaging member.

4. In a bale stacker drawn by a traveling rear delivery hay baler having longitudinally extending draft means connected to the baler and extending in a rearward direction, the combination of a bale engaging member disposed at the rearward ends of said draft means and engageable with the rear end of a bale delivered by the baler, an upright fixed relative to said draft means and disposed laterally of the bale, pivot means between said upright and bale engaging member and having a substantially vertical axis and supporting said member for swinging movement in a substantially horizontal plane from a bale engaging position to a lateral position clear of the bale, latching means acting between said draft means and bale engaging member for holding said bale engaging member in bale engaging position and a trip engageable with the rear end of a following bale, a second upright fixed relative to said draft means and disposed laterally of the bale, pivot means between said second named upright and trip and having a substantially vertical axis, said trip upon engagement with the following bale being moved a lateral direction in a substantially horizontal plane from a bale engaging position to a position clear of the second named bale and in a direction to move the latching means into unlatching position to unlatch said bale engaging member.

5. In a bale stacker drawn by a traveling rear delivery hay baler delivering at an elevation above the height of a bale, said stacker having longitudinally extending draft members connected to the baler and extending in a rearward direction, the combination of first and second uprights secured to said draft members at the rear ends thereof and spaced to pass the bales therebetween, bearings on the first upright, a first substantially vertical shaft rotatably supported in said bearings, a first arm secured to said shaft, said arm having a bale engaging part normally disposed intermediate said uprights, a second arm attached to said shaft and normally extending in a substantially front to back direction, bearings on said second upright, a second substantially vertical shaft rotatably supported in said bearings, a third arm secured to said second shaft, a trip carried by said third arm and normally disposed between said first and second uprights, a fourth arm secured to said second shaft and normally extending in a transverse direction outwardly of said second upright and a link connecting said second arm with said fourth arm and normally lying substantially in alignment with said fourth arm to latch said bale engaging member from movement.

6. In a bale stacker drawn by a traveling rear delivery hay baler delivering at an elevation above the height of a bale, said stacker having longitudinally extending draft members connected to the baler and extending in a rearward direction, the combination of first and second uprights secured to said draft members at the rear ends thereof and spaced to pass the bales therebetween, bearing means including a bearing on the first upright, a first substantially vertical shaft rotatably supported in said bearing, a first arm secured to said shaft, said arm having a bale engaging part normally disposed intermediate said uprights, a second arm attached to said shaft and normally extending in a substantially front to back direction, bearing means including a bearing on said second upright, a second substantially vertical shaft rotatably supported in said bearing, a third arm secured to said second shaft, a trip carried by said third arm and normally disposed between said first and second uprights, a fourth arm secured to said second shaft and normally extending in a transverse direction outwardly of said second upright, a link connecting said second arm with said fourth arm and normally lying substantially in alignment with said fourth arm to latch said bale engaging member from movement, and resilient means acting between a part fixed relative to said shaft and a part fixed relative to said draft members.

7. In a bale stacker drawn by a traveling rear delivery hay baler delivering at an elevation above the height of a bale, said stacker having longitudinally extending draft members connected to the baler and extending in a rearward direction, the combination of first and second uprights secured to said draft members at the rear ends thereof and spaced to pass the bales therebetween, bearing means including a bearing on the first upright, a first substantially vertical shaft rotatably supported in said bearing, a first arm secured to said shaft, said arm having a bale engaging part normally disposed intermediate said uprights, a second arm attached to said shaft and normally extending in a substantially front to back direction, bearing means including a bearing on said second upright, a second substantially vertical shaft rotatably supported in said bearing, a third arm secured to said second shaft, a trip carried by said third arm and normally disposed between said first and second uprights, a fourth arm secured to said second shaft and normally extending in a transverse direction outwardly of said second upright, a link connecting said second arm with said fourth arm and normally lying substantially in alignment with said fourth arm to latch said bale engaging member from movement, said bale engaging member being disposed at a height above the ground less than the height of one bale, and said trip being disposed above the ground a height less than two bales and greater than one bale.

8. In a bale stacker drawn by a traveling rear delivery hay baler delivering at an elevation above the height of a bale and including spaced runners connected to the baler and engaging the ground and on a number of which bales may be deposited by the baler in lower and upper rows, the combination of uprights extending upwardly from the rear ends of the outermost of said runners and supported thereby, bearing means including a bearing carried by one of said uprights, and having a vertical axis, a bale engaging member engageable with the rear end of a bale in the lower row and journaled in said bearing means for swinging movement in a substantially horizontal plane from a bale engaging position to the rear of the bale and to a lateral position clear of the path of movement of the bale, latching means carried by the other of said uprights and engaging and holding said bale engaging member in bale engaging position, bearing means including a bearing carried by the other upright and having a vertical axis, a trip engageable with the rear end of a bale in the upper row and journaled in said second named bearing means for swinging movement in a substantially horizontal plane from a position to the rear of the bale in the upper row and to a lateral position clear of the path of movement of said bale, said trip being connected to and operating said latching means.

9. In a bale stacker drawn by a traveling rear delivery hay baler delivering at an elevation above the height of a bale and including spaced runners connected to the baler and engaging the ground and on a number of which bales may be deposited by the baler in lower and upper rows, the combination of uprights extending upwardly from the rear ends of the outermost of said runners and supported thereby, bearing means including a bearing on the first upright, a first substantially vertical shaft rotatably supported in said bearing, a first arm secured to said shaft, said arm having a bale engaging part normally disposed intermediate said uprights, a second arm attached to said shaft and normally extending in a substantially front to back direction, bearing means including a bearing on said second upright, a second substantially vertical shaft rotatably supported in said bearing, a third arm secured to said second shaft, a trip carried by said third arm and normally disposed between said first and second uprights, a fourth arm secured to said second shaft and normally extending in a transverse direction outwardly of said second upright, a link connecting said second arm wth said fourth arm and normally lying substantially in alignment with said fourth arm to latch said bale engaging member from movement, and resilient means acting between a part fixed relative to said first shaft and a part fixed relative to said draft members.

10. In a bale stacker drawn by a traveling rear delivery hay baler delivering at an elevation above the height of a bale and including spaced runners connected to the baler and engaging the ground and on a number of which bales may be deposited by the baler in lower and upper rows, the combination of uprights extending upwardly from the rear ends of the outermost of said runners and supported thereby, bearing means including a bearing on the first upright, a first substantially vertical shaft rotatably supported in said bearing, a first arm secured to said shaft, said arm having a bale engaging part normally disposed intermediate said uprights, a second arm attached to said shaft and normally extending in a substantially front to back direction, bearing means including a bearing on said second upright, a second substantially vertical shaft rotatably supported in said bearing, a third arm secured to said second shaft, a trip carried by said third arm and normally disposed between said first and second uprights, a fourth arm secured to said second shaft and normally extending in a transverse direction outwardly of said second upright, and a link connecting said second arm with said fourth arm and normally lying substantially in alignment with said fourth arm to latch said base engaging member from movement.

11. In a bale stacker drawn by a traveling rear delivery hay baler delivering at an elevation above the height of a bale and including spaced runners connected to the baler and engaging the ground and on a number of which bales may be deposited by the baler in lower and upper rows, the combination of uprights extending upwardly from the rear ends of the outermost of said runners and supported thereby, bearing means including a bearing on the first upright, a first substantially vertical shaft rotatably supported in said bearing, a first arm secured to said shaft, said arm having a bale engaging part normally disposed intermediate said uprights, a second arm attached to said shaft and normally extending in a substantially front to back direction, bearing means including a bearing on said second upright, a second substantially vertical shaft rotatably supported in said bearing, a third arm secured to said second shaft, a trip carried by said third arm and normally disposed between said first and second uprights, a fourth arm secured to said second shaft and normally extending in a transverse direction outwardly of said second upright, a link connecting said second arm with said fourth arm and normally lying substantially in alignment with said fourth arm to latch said bale engaging member from movement, said bale engaging member being disposed at a height above the ground less than the height of one bale, and said trip being disposed above the ground a height less than the height of two bales and greater than the height of one bale.

References Cited in the file of this patent

UNITED STATES PATENTS

| | | |
|---|---|---|
| 2,500,441 | Vander Schuur et al. | Mar. 14, 1950 |
| 2,672,808 | Eldert | Mar. 23, 1954 |
| 2,727,352 | Jones | Dec. 20, 1955 |
| 2,822,659 | Moore | Feb. 11, 1958 |